United States Patent [19]

Brennan et al.

[11] Patent Number: 4,657,992

[45] Date of Patent: Apr. 14, 1987

[54] PASTE ANHYDRIDE CURING SYSTEM FOR CAST EPOXY RESIN BODIES AND METHOD FOR MAKING THE SAME

[75] Inventors: Anthony Brennan, Lakewood; Edmee Files, Aurora, both of Colo.

[73] Assignee: Coors Porcelain Company, Golden, Colo.

[21] Appl. No.: 830,220

[22] Filed: Feb. 18, 1986

[51] Int. Cl.$^4$ .............................................. C08L 63/04
[52] U.S. Cl. .................................. 525/482; 433/213; 264/331.12; 264/236
[58] Field of Search ................... 525/482; 264/331.12, 264/236

[56] References Cited

U.S. PATENT DOCUMENTS

| | | | |
|---|---|---|---|
| 3,932,343 | 1/1976 | Barie | 525/482 X |
| 4,374,076 | 2/1983 | Stephan et al. | 525/504 X |
| 4,544,432 | 10/1985 | Foister et al. | 525/482 X |

Primary Examiner—Earl Nielsen
Attorney, Agent, or Firm—Reising, Ethington, Barnard, Perry & Milton

[57] ABSTRACT

The instant invention provides a method for making a cast epoxy resin body and the epoxy formulation therefor wherein the formulation includes a two part system. Component A of the system when mixed with Component B in a ratio of 10 to 40 parts of Component B to 100 parts of Component A undergoes a polymerization reaction to form the solid body. Component A consists essentially of from 40 to 70% by weight epoxy novolac polymer, from 30 to 50% by weight vinyl 3-cyclohexene diepoxide and from 0 to 20% by weight 3,4 epoxy cyclohexylmethyl-3,4-epoxy cyclohexane carboxylate. Component B of the system is a paste anhydride consisting essentially of a mixture of a partially hydrolyzed aryl tetracarboxylic acid dianhydride and an alicylic dicarboxylic anhydride.

22 Claims, 3 Drawing Figures

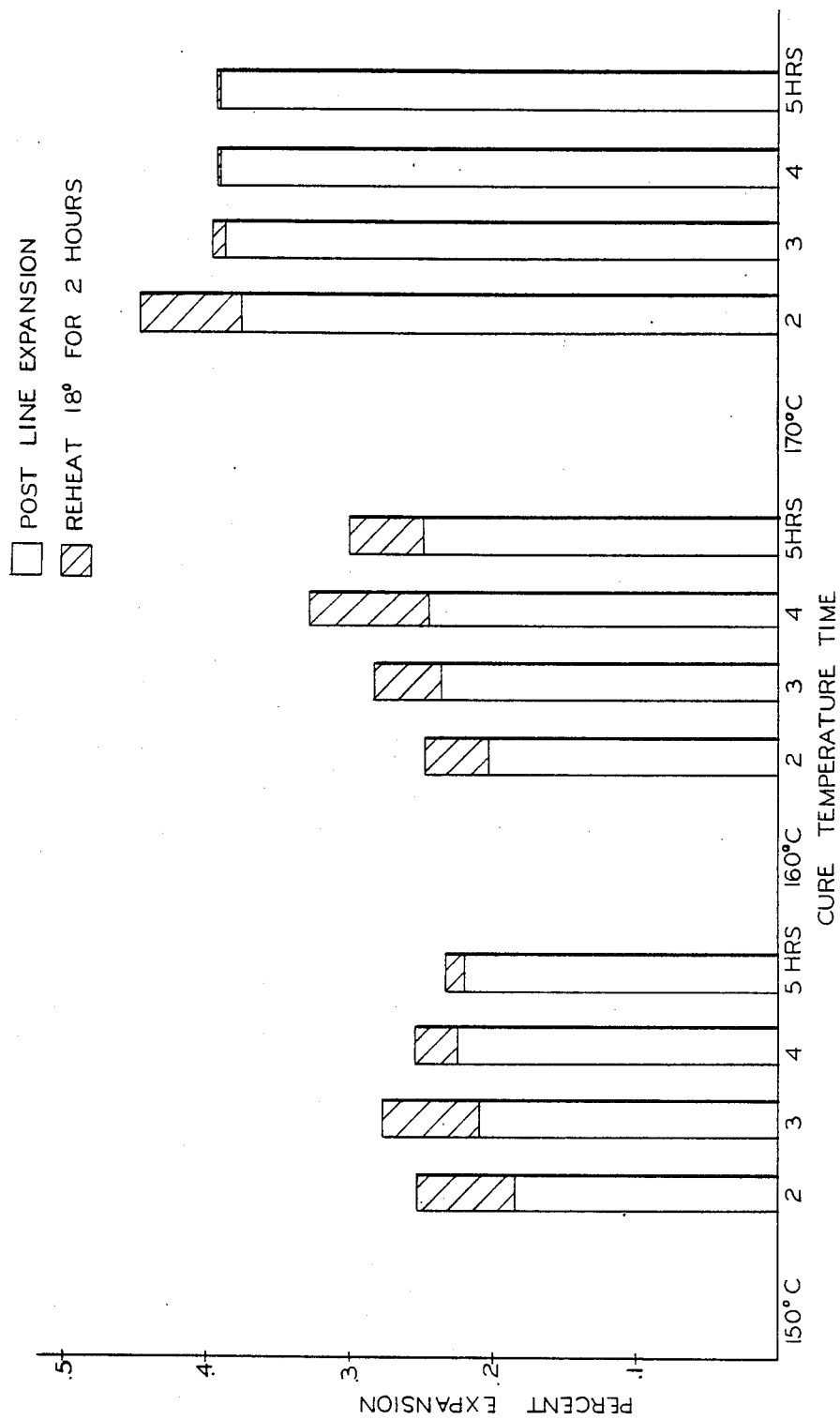

PASTE ANHYDRIDE CURING SYSTEM FOR CAST EPOXY RESIN BODIES AND METHOD FOR MAKING THE SAME

TECHNICAL FIELD

The subject matter of this invention relates to a method for making cast epoxy resin bodies to close tolerances and an epoxy resin formulation for use in making such bodies. The invention has particular utility and advantages for making tooth models for the preparation of dental crowns, though the invention has utility in many other fields.

BACKGROUND ART

The U.S. Pat. No. 4,374,076 to Stephan et al, issued Feb. 15, 1983 and assigned to the assignee of the instant invention discloses a method for making cast precision epoxy resin bodies and an epoxy resin formulation for use therein. The epoxy resin formulation includes a two or three component system. Component A of the system consists essentially of epoxy novolac polymer, vinyl-3-cyclohexane diepoxide and 3,4 epoxy cyclohexyl-methyl-3,4-epoxy cyclohexane carboxylate. Component B of the system consists essentially of a partially hydrolyzed aryl tetracarboxylic acid dianhydride, preferably partially hydrolyzed pyromellitic acid dianhydride (PMDA). In the preferred embodiments, a tertiary amine is also included in the composition. The method and epoxy resin formulation disclosed in the Stephan et al patent corrected the shrinkage which occurred during the curing of prior art epoxy resins to hardness by an additional post curing heating step causing permanent expansion of the cured solid body at least sufficient to compensate for any shrinkage during the casting and hardening thereof while in the mold.

The instant invention provides a paste anhydride for improved handling, performance, and stability in the aforementioned system.

SUMMARY OF THE INVENTION

The instant invention provides a formulation for making a cured epoxy resin solid body characterized by its ability to undergo controlled post cured heating thereof, the formulation having the following components A and B which, when mixed with each other in ratio of 10 to 40 parts of component A with 100 parts of component B, undergo a polymerization reaction to form the body. Component A consists essentially of from 40% to 70% by weight epoxy novolac polymer; from 30% to 50% by weight vinyl-3-cyclohexene diepoxide and from 0 to 20% by weight 3,4 cyclohexlymethyl-3,4-epoxy cyclohexane carboxylate. The formulation is characterized by component B being a paste anhydride consisting essentially of a mixture of a partially hydrolyzed aryl tetracarboxylic acid dianhydride and an alicyclic dicarboxylic anhydride. The instant invention further provides a method for making a cast epoxy resin body to close shaped tolerances wherein the method includes the steps of forming the component B paste anhydride, forming a uniform mixture of component A and component B in a ratio of from 10 to 40 parts component B to 100 component A, casting the mixture in a mold, the mixture being allowed to remain in the mold until it cures to a solid body, and heating the solid body for a sufficient period of time and at a sufficient temperature to cause it to permanently expand at least sufficiently to compensate for the shrinkage of the body which occurred during the curing thereof in the mold.

DESCRIPTION OF THE DRAWINGS

Other advantages of the present invention will be readily appreciated as the same becomes better understood by reference to the following detailed description when considered in connection with the accompanying drawings wherein:

FIG. 3 is a graph illustrating the effective cure temperature/time on post cure expansion.

DETAILED DESCRIPTION OF THE INVENTION

Figure 1:
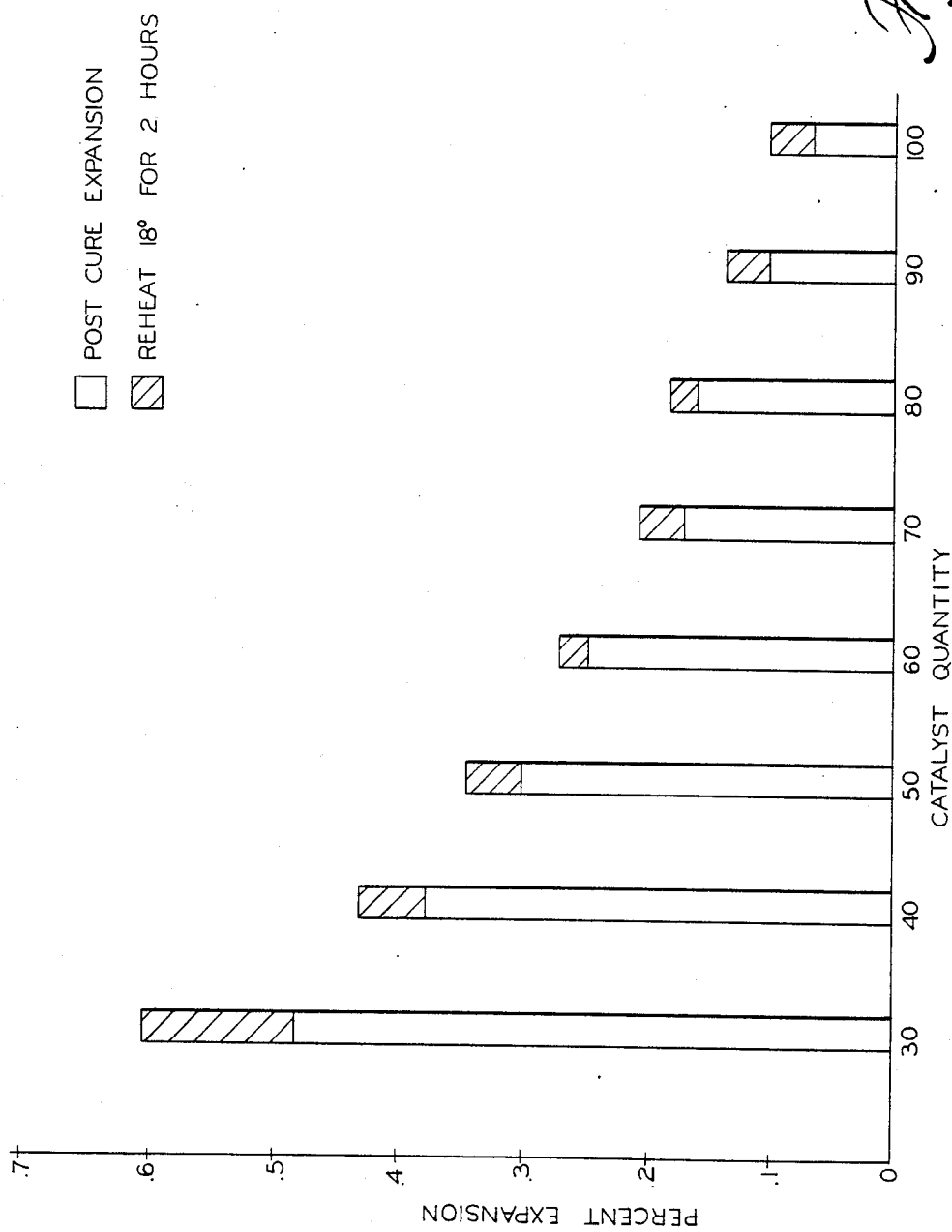
FIG. 1 is a graph illustrating the effect of catalyst on post cure expansion.

A formulation for making a cured epoxy resin solid body able to undergo post cure heating thereof includes a two or three component system. The cured body may take the many forms, such as a thick mass, thin film or various other shapes and sizes.

The system includes components A and B which, when mixed with each other in a ratio of 10 to 40 parts of component B to 100 parts of component A, undergoes a polymerization reaction to form a body.

Component A consists essentially of from 40 to 70% by weight epoxy novlac polymer, from 30% to 50% by weight vinyl 3-cyclohexane diepoxide, and from 0 to 20% by weight 3,4 epoxy cyclohexylmethyl-3,4-epoxy cyclohexane carboxylate.

It is preferred that the epoxy novolac polymer have an n of about 0.6. The epoxy novolac polymer sold by the Dow Chemical Company of Midland, Mich. under the designation epoxy novolac DEN 438 is excellent for the practice of the invention.

The most preferred ranges of component A ingredients are (all percentages being by weight): from about 50 to 65% of the epoxy novolac polymer; from 35 to 45% vinyl-3-cyclohexene diepoxide; and from 0 to 10% 3,4 epoxy cyclohexlymethyl 3,4-epoxy cyclohexane carboxylate.

Component A is preferrably prepared by first preheating the epoxy novolac polymer to 60° C., which lowers its viscosity, after which the vinyl 3-cyclohexene diepoxide and the 3,4-epoxy cyclohexylmethyl-3,4 epoxy cyclohexane carboxylate, if used, are added to the preheated novolac in the precise proportions desired within the above ranges. The mixture is then vigorously mixed while at such temperature until a homogenous mixture is attained, after which the mixture can be allowed to cool to room temperature. Such mixing can be accomplished within a few minutes, generally less, depending on the size of the batch.

Component B is a paste anhydride consisting essentially of a mixture of a partially hydrolyzed aryl tetracarboxylic acid dianhydride and an alicyclic dicarboxylic anhydride. Component B may include 20 to 50 parts of the anhydride and 50 to 80 parts of the dianhydride. Preferably, the alicyclic dicarboxylic anhydride is nadic methyl anhydride. Suitable acid anhydrides are Ciba-Geigy 906 hardener and AC-Methyl manufactured by Anhydrides and Chemicals.

The preferred aryl tetracarboxylic acid dianhydride is partially hydrolyzed pyromellitic acid dianhydride. Preferably, either 60 mesh or pulverized pyromellitic dianhydride may be used to practice the invention.

The broadest range of an acceptable formulation for the paste anhydride is 50 to 80 parts of the pyromellitic acid dianhydride to 20 to 50 parts of the nadic methyl anhydride. Preferably, 60 to 70 parts of the dianhydride are mixed with 30 to 40 parts of the anhydride.

When preparing the cured epoxy resin solid body, the broadest range of acceptable formulations for the epoxy have been determined for a 12 gram and 35 gram kit or package. For the 12 gram package, the broadest range of acceptable formulations is 20 to 40 parts of component B to 100 parts of component A. The preferred range is 25 to 35 parts component B to 100 parts of component A. For the 35 gram package, the broadest range of acceptable formulations is 10 to 30 component B to 100 parts component A. The preferred range is 15 to 25 parts component B to 100 parts component A.

Although the invention may be practiced without the requirement of a catalyst, a third ingredient containing a small amount of a tertiary amine to catalyze the cure reaction is desirable. Tertiary amines such as benzyl dimethyl tertary amine, (dimethyl amino methyl) phenol and tri (dimethyl amino methyl) phenol may be used. Preferably, benzyl dimethyl amine is used. The benzyl dimethyl amine may be purchased as Accelerator DY062 from Ciba-Geigy.

In either the 12 or 35 gram packages, the broadest range of catalysts used is 0.01 to 0.20 parts by total weight. The preferred level of catalysts is 0.05 to 0.10 parts by weight.

The instant invention provides a method for making the cast epoxy resin bodies to close shape tolerances. The method includes the steps of forming the component B paste anhydride from the mixture of partially hydrolyzed aryl tetracarboxylic acid dianhydride and an alicyclic dicarboxylic anhydride and combining component A and component B in a ratio of from 10 to 40 parts component B to 100 parts component A. The mixture is cast in a mold, the mixture being allowed to remain in the mold until it cures to a solid body. The solid body is heated for a sufficient period of time at any sufficient temperature to cause it to permanently expand at least sufficiently to compensate for the shrinkage of the body which occurred during the curing thereof in the mold.

The solid body may be heated for two to five hours at a temperature of 140 to 200° C. Preferably, the solid body is heated for 2.5 to 4 hours at a temperature of 150° to 170° C.

After eight hours, the cured epoxy resin body is removed from the impression and allowed to remain, or is maintained, at room temperature until the post cure heat treatment is performed.

Initially, components A and B, and the third component if it is used, are mixed for a few minutes, the exact mixing time being dependent on the size of the batch being mixed. Preferably, the mixture is then placed in a vacuum chamber and deaired under a vacuum of about 27 to 30 inches of mercury for approximately one to three minutes, the exact time being dependent on the size of the batch. The next step is to put the liquid epoxy into the impression of the prepared tooth of which a model is desired. Preferably, some of the epoxy is first brushed onto all of the surfaces of the impression after which the epoxy is poured into the impression until it is filled. The epoxy is then allowed to cure for about eight hours minimum at room temperature. A cure at room temperature is preferred to a cure at higher temperatures even though the latter shortens the curing time.

An accelerated cure may be obtained by combining 20 to 40 parts of component B to 100 parts of component A. Up to 0.10 parts of the tertiary amine catalyst is added to the mixture. The solid body is heated from two to five hours at a temperature of 25° to 50° C. Preferably, the accelerated curing step includes the steps of combining 25 to 35 parts of component B to 100 parts of component A. 0.01 to 0.03 of the tertiary amine catalyst is added. The liquid mixture (solution) is heated from 2.5 to 3.5 hours at 30° to 40° C.

EXPERIMENTAL EXAMPLES

Two liquid anhydrides were evaluated with both 60 mesh and pulverized pyromellitic dianhydride. Table I lists the formulations used in the study. A 12 gram package and 35 gram package were formulated with the same anhydride but different resin blends as listed in Table II. Both systems required an over night room temperature cure followed by a three hour post cure at 160° C.

Tables III and IV list the 12 gram, 20 gram, and 35 gram formulations with varying anhydride to resin ratios, catalysts concentration, anhydride and resin forumlations that were evaluated.

Effects on post cure expansion by varying catalysts, anhydride concentrations, and post cure temperatures/time were determined. After post cure, the epoxy was reheated by placing the solid body in a 180° C. oven for two hours. Additional expansion was measured as shown in FIGS. 1 and 3.

Tables V and VI provide the following parameters which were determined for the 12 and 35 gram kits:
1. Post-cure expansion according to STM 0002 with reheat expansion.
2. Post-cure flexural strength according to STM 0058.
3. Exotherm profile according to STM-0056.
4. Work time according to STM-0013-1.
5. Acrylic fit determinations using epoxy master II.
6. Viscosity of resin according to STM-0021.
7. Coefficient of thermal expansion.

The final product from 12 and 35 gram kits were evaluated and the following tests were completed as indicated in Table VII:
1. Barcol hardness.
2. Heat deflection.
3. Compressive strength.
4. Young's tensile modulus.
5. Flexural modulus.

Table VII further compares the instant invention as titled new epoxy model/die product vs. the product derived from the Stephan et al patent.

From the test results shown in Tables I-VII, it was determined that the best over all results were found with Ciba-Geigy 906 hardener as the liquid anhydride to be blended with the dianhydride. A ratio of 65 to 35 of the dianhydride to anhydride was determined to provide the best properties, good dimensions, and excellent handling in mixing performances. It was noted that as the level of liquid anhydride increased, a soft over night room temperature cure state resulted. Mixing difficulties were encountered when the level of dianhydride was increased.

The 12 and 35 gram kits were formulated with the same resin and paste anhydride formulations. The catalyst content is constant for both 12 and 35 gram packages for both die duplication and for the manufacture of a full arch. Preferably, it was found that both systems are cured over night at room temperature and post cured at 160° C. for three hours.

Figure 2:
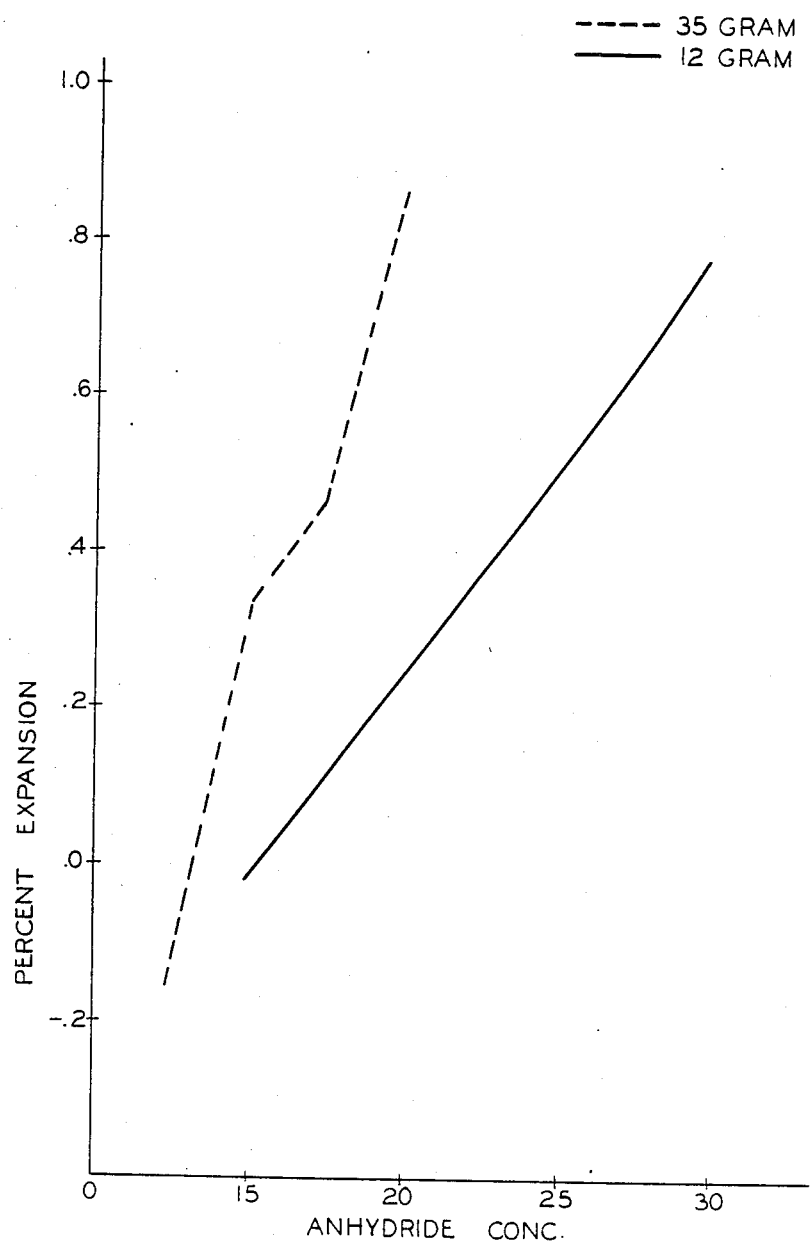
FIG. 2 is a graph illustrating the effect of anhydride concentration on post cure expansion.

As shown in FIGS. 1 through 3, the post cure expansion of the epoxy increased as the following parameters increased: anhydride concentration, post cure temperature, and post cure time. Conversely, increased catalyst concentration decrease the post cure expansion.

Table V gives the following parameters for the 12 and 35 gram kits:
1. Post cure expansion.
2. Post cure flexural strength.
3. Work time.
4. Coefficient of thermal expansion.

Exotherm profiles for the 12 and 35 gram packages are given in Table VI.

Table VII compares the current epoxy system as disclosed in the Stephan et al patent to the instant invention, comparing heat deflection, temperature, Barcol hardness, Young's flexural and tensile modulus, and compressive strength values. The instant invention provides increased values in each comparison.

The prior art system was designed to provide an oversized full model by decreasing catalyst from that which was used for die duplication. The instant invention has been designed to provide a laboratory with a very accurate duplication of the actual arch that is molded. This lends itself to the fabrication of multiple units with complex geometries.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

TABLE I

PASTE ANHYDRIDE FORMULATIONS

| Paste Anhydride | CIBA Geigy 906 Hardener | AC-M25 | PMDA 60 Mesh | Pulverized PMDA |
|---|---|---|---|---|
| 3304-1 | | 52.326 | | 47.674 |
| 3304-1A | 52.326 | | 47.674 | |
| 3304-6 | | 52.326 | 47.674 | |
| 3304-7 | 50.0 | | 50.0 | |
| 3304-8 | 80.0 | | 20.0 | |
| 3304-9 | 35.0 | | 65.0 | |
| 3304-10 | 60.0 | | 40.0 | |
| 3304-11 | 50.0 | | 50.0 | |

TABLE II

EPOXY RESIN FORMULATIONS

| Resin Blends | DEN+ 438 | ERL≠ 4221 | ERL≠ 4206 | Pigment* | Antifoam A** |
|---|---|---|---|---|---|
| 3304-2 | 51.0 | 8.0 | 40.0 | BRN 1.0 | 0.1 |
| 3304-3 | 45.0 | 8.0 | 46.0 | BRN 1.0 | 0.1 |
| 3304-4 | 40.0 | 8.0 | 51.0 | BRN 1.0 | 0.1 |
| 3304-12 | 50.74 | 21.0 | 28.0 | BRN 0.16 | 0.1 |
| 3304-13 | 51.0 | 8.0 | 39.90 | BLUE 1.0 | 0.1 |
| 3304-15 | 50.3 | 20.83 | 27.77 | BLUE 1.0 | 0.1 |
| 3304-18 | 50.3 | 20.83 | 27.77 | BEIGE 1.0 | 0.1 |
| 3304-19 | 51.0 | 8.0 | 39.90 | BEIGE 1.0 | 0.1 |
| 2334 | 45.0 | 8.0 | 46.0 | BLUE 0.9 | 0.1 |
| 2624 | 45.0 | 6.0 | 48.0 | BLUE 0.9 | 0.1 |
| 2714 | 48.0 | 6.0 | 45.0 | BLUE 0.9 | 0.1 |

+ Product of Dow Chemical
≠ Product of Union Carbide ERL-4221 is 3,4 epoxycyclohexyl 3,4-epoxycyclohexane carboxylate, and ERL-4206 is vinylcyclohexene dioxide.
*BRN — Brown Epoxy Color by Emerson Cumming
BLUE — Blue Pigment #2339 by Pigment Dispersions, Inc.
BEIGE — Beige Pigment by Pigment Dispersions, Inc.
**Product of Dow Corning

TABLE III

20 GRAM FORMULATIONS FOR EPOXY PAST SYSTEM

| Formulation | Anhydride to Resin Ratio | Resin | Anhydride[1] | BDMA+ | EMI-24+ | NMP* |
|---|---|---|---|---|---|---|
| I | 0.335 | 3304-2 | 3304-1A | 70 | 0.36 | |
| II | 0.429 | 3304-3 | 3304-1A | 70 | 0.36 | |
| III | 0.429 | 3304-2 | 3304-1A | 70 | 0.36 | |
| IV | 0.333 | 3304-4 | 3304-1A | 70 | 0.36 | |
| V | 0.250 | 3304-2 | 3304-1A | 70 | — | |
| VI | 0.250 | 3304-2 | 3304-1A | 70 | 0.36 | |
| VII | 0.333 | 3304-3 | 3304-1A | 70 | 0.36 | |
| VIII | 0.333 | 3304-4 | 3304-5 | 70 | — | |
| XIX | 0.333 | 3304-4 | 3304-5 | 40 | — | |
| X | 0.429 | 3304-4 | 3304-5 | 40 | — | |
| XI | 0.429 | 3304-4 | 3304-6 | 40 | — | |
| XII | 0.429 | 3304-4 | 3304-6 | — | — | 40 1 |
| XIII | 0.429 | 3304-4 | 3304-7 | 40 | — | |
| XIV | 0.429 | 3304-2 | 3304-7 | 40 | — | |
| XV | 0.429 | 3304-2 | 3304-8 | 40 | — | |
| XVI | 0.250 | 3304-2 | 3304-7 | 70 | — | |
| XVII | 0.333 | 3304-2 | 3304-7 | 70 | — | |
| XVIII | 0.176 | 3304-2 | 3304-7 | 80 | — | |
| XIX | 0.538 | 3304-2 | 3304-7 | 70 | — | |

+BDMA — Benzyl dimethyl amine - Ciba Dy-062 - Product of Ciba Giegy
+EMI-24 — Imidiazole - Product of Fike Chemicals
*NMP —n methyl pyrrolidnone

TABLE IV

12 & 35 GRAM FORMULATIONS FOR EPOXY PASTE SYSTEM

| Total Grams | Formulation | Anhydride to Resin Ratio | Resin | Anhydride |
|---|---|---|---|---|
| 35 | XX | 0.167 | 3227 | 3304-9 |
| 35 | XXI | 0.233 | 3227 | 3304-9 |
| 35 | XXII | 0.167 | 3227 | 3304.10 |

TABLE IV-continued
12 & 35 GRAM FORMULATIONS FOR EPOXY PASTE SYSTEM

| Total Grams | Formulation | Anhydride to Resin Ratio | Resin | Anhydride |
|---|---|---|---|---|
| 35 | XXIII | 0.233 | 3227 | 3304-10 |
| 35 | XXIV | 0.233 | 3227 | 3304-11 |
| 35 | XXV | 0.233 | 3227 | 3304-7 |
| 35 | XXVI | 0.300 | 3304-12 | 3304-11 |
| 35 | XXVII | 0.300 | 3304-12 | 3304-9 |
| 35 | XXVIII | 0.301 | 3304-12 | 3304-11 |
| 35 | XXIX | 0.250 | 3304-12 | 3304-11 |
| 35 | XXX | 0.250 | 3304-12 | 3304-9 |
| 35 | XXXI | 0.167 | 3304-12 | 3304-9 |
| 20 | XXXII | 0.333 | 3304-2 | 3304-11 |
| 12 | XXXIII | 0.333 | 3304-2 | 3304-11 |
| 12 | XXXIV | 0.333 | 3304-12 | 3304-11 |
| 35 | XXXV | 0.129 | 3304-12 | 3304-9 |
| 35 | XXXVI | 0.333 | 3304-13 | 3304-9 |
| 12 | XXXVII | 0.333 | 3304-13 | 3304-11 |
| 35 | XXXVIII | 0.167 | 3304-2 | 3304-9 |
| 12 | XXXIX | 0.333 | 3304-13 | 3304-9 |
| 12 | XL | 0.200 | 3304-2 | 3304-9 |
| 12 | XLI | 0.200 | 3304-13 | 3304-9 |
| 12 | XLII | 0.263 | 3304-13 | 3304-9 |
| 35 | XLIII | 0.167 | 3304-14 | 3304-9 |
| 35 | XLIV | 0.148 | 3304-14 | 3304-9 |
| 35 | XLV | 0.167 | 3304-15 | 3304-9 |
| 35 | XLVI | 0.148 | 3304-15 | 3304-9 |
| 35 | XLVII | 0.148 | 3304-15* | 3304-9 |
| 35 | XLVIII | 0.207 | 3304-15 | 3304-9 |
| 35 | XLIX | 0.148 | 3304-16 | 3304-9 |
| 35 | L | 0.186 | 3304-15 | 3304-9 |
| 12 | LII | 0.263 | 3304-17 | 3304-9 |
| 20 | LIII | 0.250 | 3304-15 | 3304-9 |
| 12 | LIV | 0.412 | 3304-13 | 3304-9 |
| 35 | LV | 0.186 | 3304-18 | 3304-9 |
| 35 | LVI | 0.190 | 3304-16 | 3304-9 |
| 12 | LVII | 0.263 | 3304-19 | 3304-9 |
| 35 | LX | 0.228 | 2334 | 3304-9 |
| 35 | LXI | 0.250 | 2334 | 3304-9 |
| 35 | LXII | 0.186 | 2624 | 3304-9 |
| 35 | LXIII | 0.207 | 2624 | 3304-9 |
| 35 | LXIV | 0.250 | 2624 | 3304-9 |
| 35 | LXV | 0.250 | 2714 | 3304-9 |
| 35 | LXVI | 0.186 | 3304-13 | 3304-9 |
| 35 | LXVII | 0.263 | 3304-13 | 3304-9 |
| 35 | LXVIII | 0.250 | 3304-13 | 3304-9 |
| 35 | LXIX | 0.228 | 3304-13 | 3304-9 |
| 35 | LXX | 0.207 | 3304-13 | 3304-9 |
| 35 | LXXI | 0.217 | 3304-13 | 3304-9 |
| 35 | LXXII | 0.204 | 3304-13 | 3304-9 |
| 12 | LXXIII | 0.298 | 3304-13 | 3304-9 |
| 12 | LXXIV | 0.326 | 3304-13 | 3304-9 |
| 35 | LXXV | 0.212 | 3304-13 | 3304-9 |
| 12 | LXXVI | 0.204 | 3304-13 | 3304-9 |

*w/Pearl Lustre - Product of EM Materials

TABLE V
Parameters of the 12 and 35 Gram Kit

| Epoxy/Catalyst Amount | | Post Cure Expansion | Post Cure Flexural Strength | Work Time | Coefficient of Thermal Expansion |
|---|---|---|---|---|---|
| 35 g; 90 μl | $\bar{x}$ | 0.248% | 20,626 psi | 6.28 sec/in | X |
| | $\sigma_{n-1}$ | .010% | 1974 psi | 0.18 sec/in | |
| | N | 5 | 5 | 3 | |
| 35 g; 65 μl | $\bar{x}$ | 0.403% | 21,988 psi | 7.11 sec/in | |
| | $\sigma-1$ | .006% | 1,322 psi | 3 sec/in | |
| | N | 5 | 5 | 3 | |
| 12 g; 65 μl | $\bar{x}$ | 0.335% | 19,768 psi | 7.75 sec/in | $80.656 \times 10^{-6}$ in/in °C. |
| | $\sigma_{n-1}$ | .010% | 1,060 psi | 0.64 sec/in | |
| | N | 5 | 5 | 3 | |
| 12 g; 90 μl | $\bar{x}$ | 0.254% | 20,813 psi | | |
| | $\sigma n-1$ | .012% | 778 psi | | |
| | N | 5 | 5 | | |

TABLE VI
Exotherm Profile on the 12 and 35 Gram Kits

| Epoxy/Catalyst Amount | Time Range | Epoxy Temperature Range | Hood Temperature Range |
|---|---|---|---|
| 12 gram; 90 μl | 0–120 minutes | 25°–38° C. Gel<br>25°–33° C. Gel<br>24°–32° C. Gel | 22°–24° C. |
| 35 gram; 90 μl | 0–120 minutes | 25°–30° C. Gel<br>25°–28° C. Gel<br>24°–37° C. Gel | 22°–24° C. |

TABLE VII

| | ASTM | CURRENT EPOXY MODEL/DIE PROD. | NEW EPOXY MODEL/DIE PROD. |
|---|---|---|---|
| Barcol Hardness | D2583 | 44.40 | 54.75 |
| Heat Deflection | D648 | 366° F. | 450° F. @ .101" |
| Stress @ 66 psi | | | |
| Young's Tensile Modulus | D638 | — | 612,317 psi |
| Flexural Modulus | D790 | 7290 psi | 574,688 psi |
| Compressive Strength | D695 | — | 20,056 |
| Tabor Abrasion | D1044 | 0.1626 g loss | — |

What is claimed is:

1. A formulation for making a cured epoxy resin solid body characterized by its ability to undergo controlled post cure expansion thereof, said formulation having the following Components A and B which, when mixed with each other in a ratio of 10 to 40 parts of Component B to 100 parts of Component A, undergo a polymerization reaction to form the body: Component A consisting essentially of from 40 to 70% by weight epoxy novolac polymer; from 30 to 50% by weight vinyl 3 cyclohexene diepoxide; and from 0 to 20% by weight 3,4 epoxy cyclohexylmethyl-3,4-epoxy cyclohexane carboxylate; and characterized by Component B being a paste anhydride consisting essentially of a mixture of a partially hydrolyzed aryl tetracarboxylic acid dianhydride and an alicyclic dicarboxylic anhydride.

2. A formulation as set forth in claim 1 further characterized by Component B including at least 50% by weight dianhydride.

3. A formulation as set forth in claim 2 further characterized by Component B including 20 to 50 parts anhydride and 50 to 80 parts dianhydride.

4. A formulation as set forth in claim 3 further characterized by said anhydride being nadic methyl anhydride.

5. A formulation as set forth in claim 4 further characterized by said dianhydride being partially hydrolyzed pyromellitic acid dianhydride.

6. A formulation as set forth in claim 5 further characterized by including 60 to 70 parts of said partially hydrolyzed pyromellitic acid dianhydride and 30 to 40 of said nadic methyl anhydride.

7. A formulation as set forth in claim 3 further characterized by said mixture of Components A and B including a tertiary amine catalyst.

8. A formulation as set forth in claim 7 further characterized by including 0.10 to 0.20 parts by weight of said catalyst.

9. A formulation as set forth in claim 8 further characterized by including said catalyst being 0.05 to 0.10 parts by weight benzyl dimethyl amine.

10. A method for making a cast epoxy resin body to close shape tolerance, said method including the steps of: forming a Component B paste anhydride from a mixture of partially hydrolyzed aryl tetracarboxylic acid dianhydride and an alicyclic dicarboxylic anhydride; forming a uniform mixture of Component A and Component B in a ratio of from 10 to 40 parts Component B to 100 parts Component A, Component A consisting esentially of from 40 to 70% by weight epoxy novolac polymer, from 30 to 50% by weight vinyl-3-cyclohexene diepoxide and from 0 to 20% by weight 3,4 epoxy cycloyexylmethyl-3,4 epoxy cyclohexane carboxylate; casting said mixture in a mold, said mixture being allowed to remain in the mold until it cures to a solid body: and heating said solid body for a sufficient period of time and at a sufficient temperature to cause it to permanently expand at least sufficiently to compensate for the shrinkage of said body which occurred during the curing thereof in the mold.

11. A method as set forth in claim 10 further characterized by Component B including at least 50% by weight dianhydride.

12. A method as set forth in claim 11 further characterized by Component B including 20 to 50 parts anhydride and 50 to 80 parts dianhydride.

13. A method as set forth in claim 12 further characterized by said anhydride being nadic methyl anhydride.

14. A method as set forth in claim 13 further characterized by said dianhydride being partially hydrolyzed pyromellitic acid dianhydride.

15. A method as set forth in claim 14 further characterized by including 60 to 70 parts of said partially hydrolyzed pyromellitic acid dianhydride and 30 to 40 of said nadic methyl anhydride.

16. A method as set forth in claim 12 further characterized by said mixture of Components A and B including a tertiary amine catalyst.

17. A method as set forth in claim 16 further characterized by including 0.10 to 0.20 parts by weight of said catalyst.

18. A method as set forth in claim 18 further characterized by including said catalyst being 0.05 to 0.10 parts by weight benzyl dimethyl amine.

19. A method as set forth in claim 12 wherein said heating step is further defined as heating said solid body for 2 to 5 hours at a temperature of 140° to 200° C.

20. A method as set forth in claim 19 wherein said heating step is further defined as heating said solid body for 2.5 to 4.0 hours at a temperature of 150° to 170° C.

21. A method as set forth in claim 12 further including the step of accelerating the cure by combining 20 to 40 parts of Components B to 100 parts of Component A, adding up to 0.10 parts of a tertiary amine catalyst and heating said liquid mixture (solution) from 2 to 5 hours at a temperature of 25° to 50° C.

22. A method as set forth in claim 21 wherein said accelerated curing step is further defined as combining 25 to 35 parts of Component B to 100 parts of Component A, adding from 0.01 to 0.03 parts of a tertiary amine catalyst, and heating said solid body for 2.5 to 3.5 hours at 30° to 40° C.

* * * * *